United States Patent [19]

Braunling et al.

[11] Patent Number: 4,468,763
[45] Date of Patent: Aug. 28, 1984

[54] SEISMIC INTRUDER DETECTION USING PRESSURE WAVES

[75] Inventors: Russell D. Braunling, Eden Prairie; Dennis L. Kurschner, Minnetonka, both of Minn.

[73] Assignee: Honeywell Inc., Minneapolis, Minn.

[21] Appl. No.: 492,112

[22] Filed: May 6, 1983

[51] Int. Cl.³ .............................................. H04B 1/06
[52] U.S. Cl. ..................................... 367/136; 340/566
[58] Field of Search ................... 367/136, 95; 340/566

[56] References Cited

U.S. PATENT DOCUMENTS 3,696,369 10/1972 Laymon et al. ...................... 367/136
4,223,304 9/1980 Barowitz et al. .................... 340/566

Primary Examiner—Maynard R. Wilbur
Assistant Examiner—M. R. Gordon
Attorney, Agent, or Firm—George W. Field

[57] ABSTRACT

In combination: a geophone having a resonant frequency in the pressure wave band and a response that decreases with frequency below the resonant frequency; an amplifier connected to the geophone and having a gain which is substantially constant for frequencies above the resonant frequency, and which varies inversely with frequency for frequencies below the resonant frequency; a band-pass filter connected to the amplifier; a single channel rectifier connected to the band-pass filter; apparatus connected to the rectifier for obtaining short term and long term averages of the rectifier output; and apparatus including a comparator connected to the last named apparatus for giving an output when the short term average exceeds the long term average by more than a predetermined amount.

3 Claims, 5 Drawing Figures

| FIG. 3 |
|---|
| FIG. 3A |
| FIG. 3B |

SEISMIC INTRUDER DETECTION USING PRESSURE WAVES

The Government has rights in this invention pursuant to Contract No. FO8635-79-C-0178, awarded by the Department of the Air Force.

TECHNICAL FIELD

This invention relates to the field of electrical communication, and more particularly to systems for detecting seismically and responding to the presence of intruders in an outdoor area.

BACKGROUND OF THE INVENTION

Occasion sometimes arises to interdict the movement of personnel in an outdoor area, or to monitor an area to give warning of the presence of intruders therein. Systems detecting the presence of intruders by seismic means are known. Aune et al. U.S. Pat. No. 3,585,581 and Barowitz et al. U.S. Pat. No. 4,090,180 are examples of such systems.

Those patents rely on "propagating" or Rayleigh seismic waves, in the frequency range of 30 to 100 Hertz. A feature of such waves is that their amplitude characteristics are very dependent on the nature of the soil through which they must travel, so that seismic apparatus adjusted to operate with satisfaction in one particular soil environment may require readjustment for satisfactory operation in a different soil environment.

BRIEF SUMMARY OF THE INVENTION

The present invention uses apparatus designed to detect the low frequency, "nonpropagating" or pressure waves, which we have found to be much less influenced by soil characteristics, so that apparatus according to the invention may be applied without readjustment in soils of widely differing characteristics.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding elements throughout the several views, FIGS. 2 and 3, 3A, 3B are schematic diagrams giving details of components suitable for use in the apparatus of FIG. 1.

DESCRIPTION OF THE PREFERRED EMBODIMENT

Figure 1:
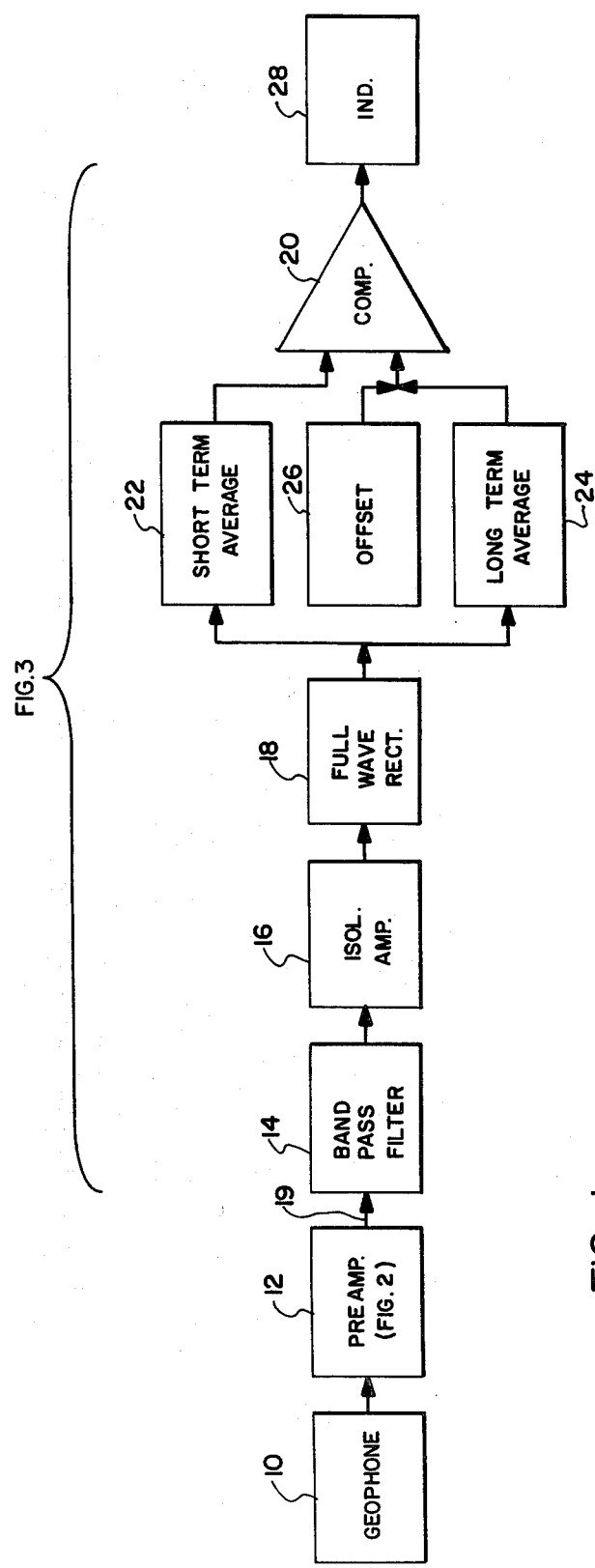
FIG. 1 is a block diagram of a preferred embodiment of the invention.

Referring first to FIG. 1, a system according to the invention comprises a geophone 10 coupled to the soils of the area being monitored, by being buried therein or lying thereon, or by being affixed to a suitable post which is so buried. The geophone is connected to supply its output to a pre-amplifier 12.

A geophone has a resonant frequency, and its sensitivity characteristic decreases with decreasing frequency at typically 12 decibels per octave. Since the frequencies of interest in this invention are below 12 Hertz, pre-amplifier 12 is configured to compensate for the geophone characteristics, being given a frequency characteristic which is flat above the geophone resonant frequency and increases with decreasing frequency at 12 decibels per octave.

The pre-amplifier output is fed through a band-pass filter 14 having cut off frequencies of about 5 and 12 Hertz, then through an isolating amplifier 16 and a full wave rectifier 18. It is desirable to make the pre-amplifier 12 a physical unit with geophone 10, but members 14, 16 and 18 may more conveniently be located at a supervisory area more or less remote from the geophone installation, and the link 19 between pre-amplifier 12 and band-pass filter 14 may then include line driving and line receiving apparatus.

The output from rectifier 18 is fed to a comparator 20 through first and second low-pass filters 22 and 24, the former having a time constant of about 4 seconds and performing short term averaging, and the latter having a time constant of about 12 seconds and performing long term averaging. Offset adjusting apparatus 26 is associated with filter 24 to enable adjustment of the effective operating range of equipment.

Comparator 20 is connected to an output device 28, which may be a visual or audible signal unit at a monitoring station, or may be an explosive device local to the geophone if interdiction is the mission of the equipment. In the latter case, units 12 and 14 would be closely coupled so that elements 10 to 26 are physically a single unit and no line driving and receiving components would be necessary.

Figure 2:
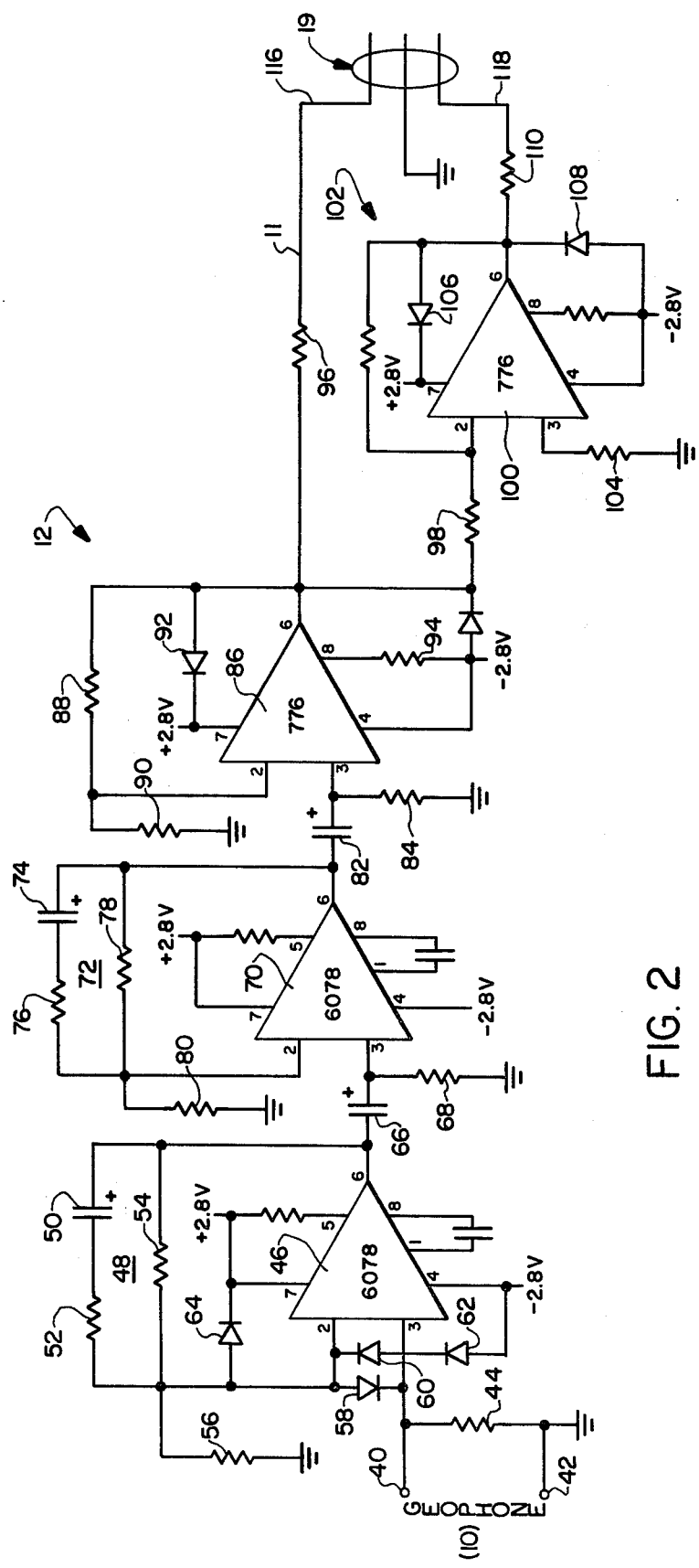

FIG. 2 shows that pre-amplifier 12 comprises three stages of amplification. The geophone output at terminals 40 and 42 is applied across a load resistor 44 and to the non-inverting input terminal of a 6078 operational amplifier 46 having a feedback network 48 connected between its output terminal and its inverting input terminal, the network comprising a capacitor 50 in series with a resistor 52, the series circuit being in parallel with a resistor 54: a ground resistor 56 is also included. Positive and negative operating voltages are supplied as shown, as are line protective diodes 58, 60, 62 and 64.

The output of amplifier 46 is supplied through a coupling circuit including capacitor 66 and input resistor 68 to the non-inverting input terminal of a second 6078 operational amplifier 70 having a feedback network 72 connected between its output terminal and its inverting input terminal, the network consisting of a capacitor 74 in series with a resistor 76, the series circuit being in parallel with a resistor 78: a ground resistor 80 is also included. Positive and negative operating voltages are supplied as shown. The output of amplifier 70 is supplied through a coupling circuit including a capacitor 82 and a resistor 84 to the non-inverting input terminal of a 776 operational amplifier 86 having a feedback resistor 88 connected between its output terminal and its inverting input terminal: a ground resistor 90 is also included. Positive and negative operating voltages are supplied as shown, and include protective diodes 92 and 94.

The output terminal of amplifier 86 is connected to link 19 through resistors 96 and 98, the latter being connected to the inverting terminal of a 776 operational amplifier 100 operating as a line driver 102. The non-inverting input terminal of amplifier 100 is grounded through a resistor 104, and positive and negative operating voltages are supplied as shown, including protective diodes 106 and 108. The output of the line driver is taken through a series resistor 110.

Figure 3A:
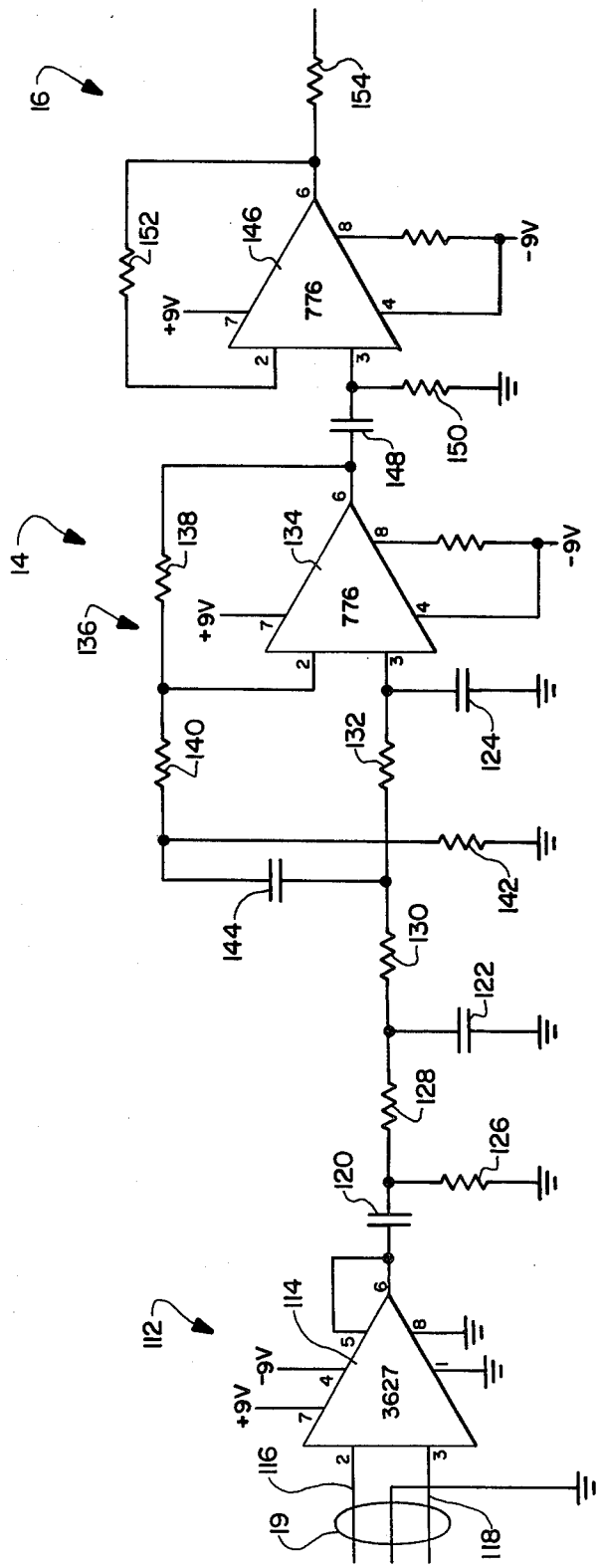

FIG. 3A shows that link 19 includes a line receiver 112 comprising a 3627 operational amplifier 114 having an inverting terminal to which resistor 96 is connected by a conductor 116, and a non-inverting input terminal to which resistor 110 is connected by a conductor 118.

The output of amplifier 114 is connected to band-pass filter 14, which comprises capacitors 120, 122, and 124 resistors 126, 128, 130, and 132, a 776 operational amplifier 134, and a feedback network 136 comprising resistors 138, 140, and 142 and a capacitor 144. Positive and negative operating voltages are supplied as shown.

Isolation amplifier 16 is shown to comprise a 776 operational amplifier 146 having a non-inverting input terminal connected to the output terminal of amplifier 134 through a coupling circuit including capacitor 148 and resistor 150. A feedback resistor 152 is connected between the output and inverting input terminals of amplifier 146. Positive and negative operating voltages are supplied as shown.

Figure 3B:
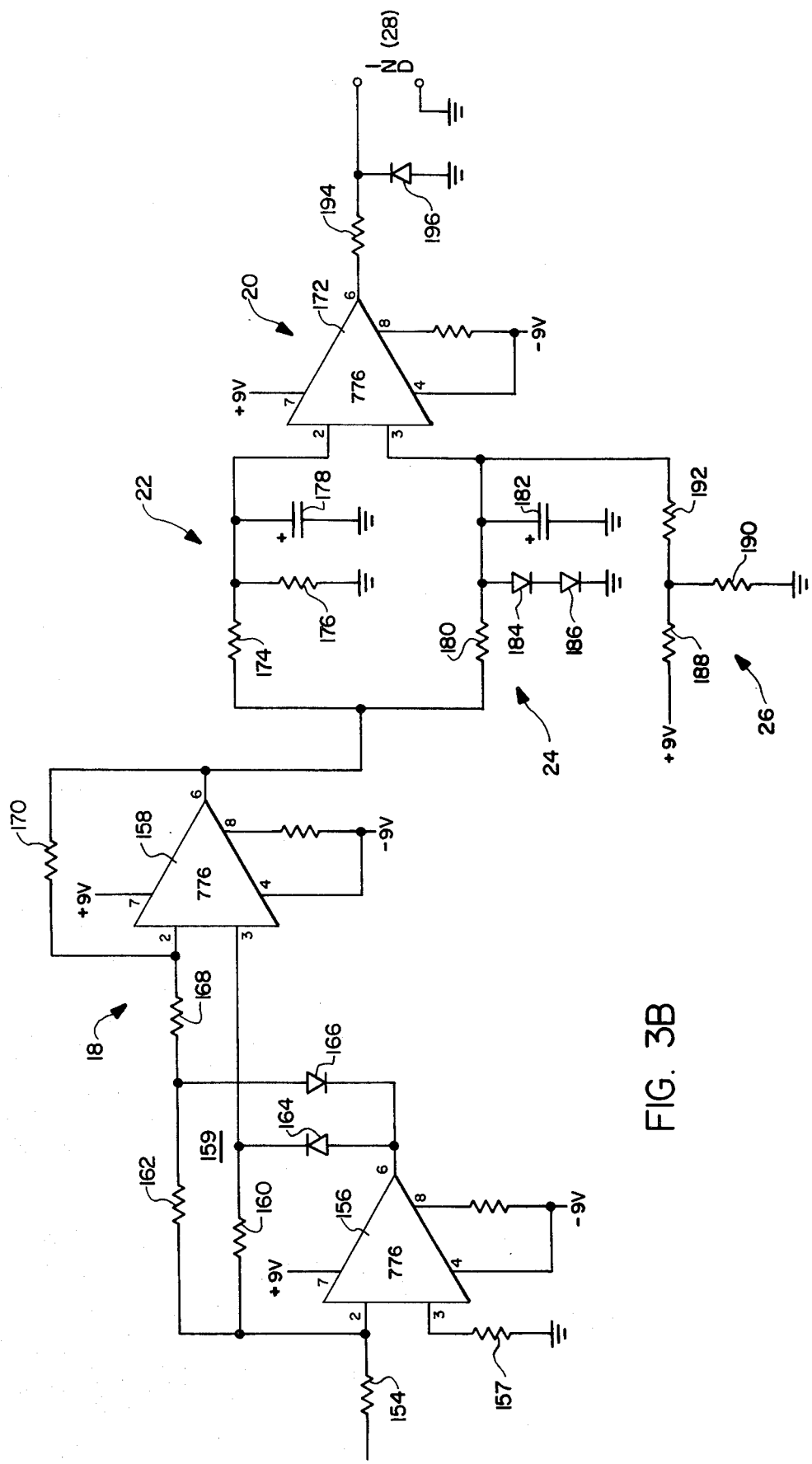

The output terminal of isolation amplifier 16 is connected through a resistor 154 (FIG. 3B) to the inverting input terminal of a further 776 operational amplifier 156 whose non-inverting input terminal is grounded through resistor 157. Amplifier 156 is interconnected with a further 776 operational amplifier 158 to comprise full wave rectifier 18, positive and negative operating voltages being supplied as shown. The output terminal of amplifier 156 is connected to the input terminal of amplifier 158 through a network 159 including feedback resistors 160 and 162, diodes 164 and 166, a coupling resistor 168, and a further feedback resistor 170.

The output terminal of amplifier 158 is connected to the inverting input terminal of a 776 operational amplifier 172, through low-pass network 22 which comprises resistors 174 and 176 and a capacitor 178, and to the non-inverting input terminal of amplifier 172, through low-pass network 24 which comprises resistor 180, capacitor 182, and a pair of series diodes 184 and 186. Also connected to the non-inverting input terminal of amplifier 172 is offset circuit 26, which comprises a voltage divider made up of resistors 188 and 190 and a coupling resistor 192. Positive and negative operating voltages are supplied as shown.

Amplifier 172 operates as comparator 20, and supplies the system output through resistor 194 to indicating device 28, a protective diode 196 being also provided.

OPERATION

The operation of the invention can best be understood from the following explanation. When a geophone is coupled to the ground there is always a signal at the background level. When such a signal is rectified and sent to averaging circuits 22 and 24, the outputs of these circuits continue generally at constant levels. By suitably selecting the components of offset apparatus 26, the inputs to comparator 20 may be so set that in the absence of an event such as an intruder, the long term average is always greater than the short term average, and the resulting signal to indicator 28 does not cause an indicator operation.

If an intruder approaches, the signal supplied by rectifier 18 increases, so that the outputs from filters 22 and 24 both also increase. However, because of the difference in time constants in circuits 22 and 24, the output of the former can increase more rapidly than the output of the latter, until the relation of the signals to comparator 20 reverses, and indicator 28 is energized to give a warning or perform whatever other function it is designed to do.

It will be realized that if the intruder moves out of the area, both average values will decrease to background level, but again the short term value can change more rapidly than the long term value, so as to become once more the smaller of the two. This means that the apparatus is self resetting, so that no external resetting is required when a detected intruder leaves the area.

From the above it will be evident that the invention comprises a geophone apparatus responsive to the seismic pressure waves to perform an alarm function when a short term average of the geophone signal becomes greater than a long term average thereof, the apparatus being passive and hence difficult to detect, and being usable without excessive recalibration in soils of various natures.

Numerous characteristics and advantages of the invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

The embodiments of the invention in which an exclusive property or right is claimed are as follows:

1. In combination:
    a geophone responsive to pressure waves and having a resonant frequency and a response that decreases with frequency below said resonant frequency;
    amplifying means connected to said geophone and having a gain which is substantially constant for frequencies above the resonant frequency, and which varies inversely with frequency, for frequencies below the resonant frequency, at about 12 decibels per octave;
    a band-pass filter connected to said amplifying means and having cut-off frequencies of about 5 Hertz and 12 Hertz;
    single channel rectifying means connected to said band-pass filter;
    means connected to the rectifying means for obtaining short term and long term averages of the output of said rectifier;
    and means including a comparator connected to the last named means for giving an output when the short term average exceeds the long term average by more than a predetermined amount.

2. The combination of claim 1 in which the means connected to said rectifying means includes first and second low-pass filters having time constants of about 12 seconds and about 4 seconds.

3. Means supplying a unidirectional signal representative of the instantaneous value of a non propagating seismic pressure wave in the frequency band of 5 to 12 Hertz;
    means determining long term and short term averages of said signal;
    and means giving an output when one of said averages exceeds the other by more than a predetermined amount.

* * * * *